(12) United States Patent
Baudasse et al.

(10) Patent No.: US 8,803,761 B2
(45) Date of Patent: Aug. 12, 2014

(54) ACTUATION SYSTEM FOR ANTENNA REFLECTOR WITH DEFORMABLE REFLECTING SURFACE

(75) Inventors: Yannick Baudasse, Grasse (FR); Stéphane Vezain, Mandelieu (FR)

(73) Assignee: Thales, Neuilly-sur-Seine (FR)

( * ) Notice: Subject to any disclaimer, the term of this patent is extended or adjusted under 35 U.S.C. 154(b) by 154 days.

(21) Appl. No.: 13/429,159

(22) Filed: Mar. 23, 2012

(65) Prior Publication Data
US 2013/0076590 A1 Mar. 28, 2013

(30) Foreign Application Priority Data
Mar. 24, 2011 (FR) ...................................... 11 00887

(51) Int. Cl.
*H01Q 15/20* (2006.01)
*H01Q 15/14* (2006.01)

(52) U.S. Cl.
USPC .......................................... 343/915; 343/912

(58) Field of Classification Search
CPC ..... H01Q 15/14; H01Q 15/147; G02B 6/3564
USPC .......................................... 343/915; 359/849
See application file for complete search history.

(56) References Cited

U.S. PATENT DOCUMENTS

| | | | | |
|---|---|---|---|---|
| 5,091,733 A | * | 2/1992 | Labruyere | 343/882 |
| 5,440,320 A | | 8/1995 | Lach et al. | |
| 5,831,780 A | * | 11/1998 | Krim | 359/846 |
| 5,976,287 A | * | 11/1999 | Parsons et al. | 156/64 |
| 2003/0234970 A1 | * | 12/2003 | Phillips et al. | 359/291 |
| 2008/0156938 A1 | * | 7/2008 | Baudasse et al. | 244/158.1 |
| 2011/0019295 A1 | | 1/2011 | Rooms et al. | |

FOREIGN PATENT DOCUMENTS

| | | |
|---|---|---|
| FR | 2678111 A1 | 12/1992 |
| WO | 2009092901 A1 | 7/2009 |

* cited by examiner

*Primary Examiner* — Dameon E Levi
*Assistant Examiner* — Ricardo Magallanes
(74) *Attorney, Agent, or Firm* — Baker & Hostetler LLP

(57) ABSTRACT

In the field of antenna reflectors with a deformable reflecting surface, an actuation system, with which such a reflector may be equipped wherein the reflector includes a chassis, a flexible membrane fixed to the chassis, comprises: a support fixed to the chassis, a set of deformation devices, each deformation device including a pusher element adapted to be driven in translation relative to the support along an axis, the pusher element including a part adapted to come into contact with the flexible membrane at a point to deform it, an actuation device adapted to drive the pusher element of one of the deformation devices in translation at the same time, and a selector device adapted to move the actuation device toward each of the deformation devices.

9 Claims, 2 Drawing Sheets

ACTUATION SYSTEM FOR ANTENNA REFLECTOR WITH DEFORMABLE REFLECTING SURFACE

CROSS-REFERENCE TO RELATED APPLICATION

This application claims priority to foreign French patent application No. FR 1100887, filed on Mar. 24, 2011, the disclosure of which is incorporated by reference in its entirety.

FIELD OF THE INVENTION

The invention lies in the field of antenna reflectors with a deformable reflecting surface. It concerns an actuation system with which such a reflector may be equipped.

BACKGROUND

A telecommunication satellite includes at least one antenna enabling transmission and reception of electromagnetic signals. Each antenna includes a reflector the shape and the orientation of which determine the terrestrial zone covered by the antenna. With the aim of covering a plurality of distinct terrestrial areas or a terrestrial area more extensive than may be covered with only one antenna, a satellite may include a plurality of antennas, each antenna covering a specific terrestrial zone. However, the number of antennas with which a satellite may be equipped is limited by the space available under the nose cone of the satellite launch vehicle. Moreover, it may be desirable to be able to modify the terrestrial zone covered by an antenna. One solution addressing this two-fold problem is to design an antenna reflector the reflecting surface of which is deformable.

There are known antenna reflectors with a deformable reflecting surface including a flexible membrane and an actuation system comprising a plurality of pusher elements. The flexible membrane may be treated in order to form a reflecting surface. Each pusher element comprises a rod and an actuator of the stepper motor or piezoelectric motor type. Each rod comes into contact with a point on the flexible membrane and may be driven in translation by the actuator in such a manner as to deform the flexible membrane locally. The set of pusher members enables a particular overall shape to be imparted to the flexible membrane. The deformation of the flexible membrane being effected in a discrete manner, it is desirable to increase the number of pusher elements to enable a reflecting surface as smooth and a regular as possible to be formed. However, increasing the number of pusher elements implies an actuation system of high mass, large overall size and high cost. Moreover, each actuator must be supplied with electrical energy and controlled individually. This results in a complex electrical interface. If the actuators are piezoelectric motors, they must be supplied with energy continuously even when they do not have to actuate the rod.

SUMMARY OF THE INVENTION

A notable object of the invention is to alleviate some or all of the drawbacks referred to above by proposing an actuation system for an antenna reflector with a deformable reflecting surface that is simple, economic, and light in weight and which enables deformation of the reflecting surface at numerous points. To this end, the invention provides an actuation system with which a reflector may be equipped including a chassis and a flexible membrane fixed to the chassis in such a manner as to be able to be deformed. The actuation system of the invention includes:

a support adapted to be fixed to the chassis of the reflector,
a set of deformation devices, each deformation device including a pusher element adapted to be driven in translation relative to the support along an axis, the pusher element including a part adapted to come into contact with the flexible membrane at a point to deform it,
an actuation device adapted to drive the pusher element of one of the deformation devices at the same time in translation along its axis, and
a selector device adapted to move the actuation device toward each of the deformation devices in such a manner that the actuation device is able to drive the pusher element of the selected deformation device in translation.

In one particular embodiment, the actuation device is adapted to generate a movement of rotation relative to the support about the axis, said movement of rotation transmitting a movement of translation to the pusher element by means of a screw/nut system.

Each deformation device may then further include:

a first rotary element adapted to be driven in rotation relative to the support about a second axis substantially parallel to the first axis by the actuation device, and
a second rotary element connected to one of the elements of the nut/screw system to rotate with it about the first axis and adapted to be driven in rotation about the first axis by the first rotary element.

Each first rotary element may include a first pulley and each second rotary element may include a second pulley. Each deformation device then further includes a belt connecting the first pulley to the second pulley. This pulley/belt system enables the deformation devices to be disposed relatively far apart.

Still in one particular embodiment, the first rotary elements are distributed over the perimeter of a circle, the selector device including a support arm that may be driven in rotation about a third axis passing through the centre of the circle and orthogonal to the plane of the circle, the actuation device being fixed to the support arm in such a manner as to be able to drive the first rotary elements of the deformation devices in rotation.

For example, the actuation device includes a motor adapted to drive each first rotary element in rotation about its second axis.

In one particular embodiment, for at least one deformation device, the actuation system further includes an elastic member one of the ends of which is connected to the part of the pusher element adapted to come into contact with the flexible membrane to move with it in translation along the first axis and another end of which is connected to the flexible membrane to move with it in translation along the first axis, the elastic element being elastically deformable along the first axis.

In this particular embodiment the actuation system may include, for each deformation device including an elastic element, a second elastic element one end of which is connected to the support to move with it in translation along the first axis and another end of which is connected to the flexible membrane to move with it in translation along the first axis, the second elastic element being elastically deformable along the first axis, the stiffness of the first elastic element along the first axis being less than the stiffness of the second elastic element along the first axis.

The invention also provides a reflector including a chassis, a flexible membrane fixed to the chassis in such a manner as to be able to be deformed, and an actuation system as described above.

The invention has the notable advantage that it enables the actuation system to include only one actuator for all the deformation points of the flexible membrane.

BRIEF DESCRIPTION OF THE DRAWINGS

The invention will be better understood and other advantages will become apparent on reading the following description, which is given with reference to the appended drawings, in which.

DETAILED DESCRIPTION

Figure 1:
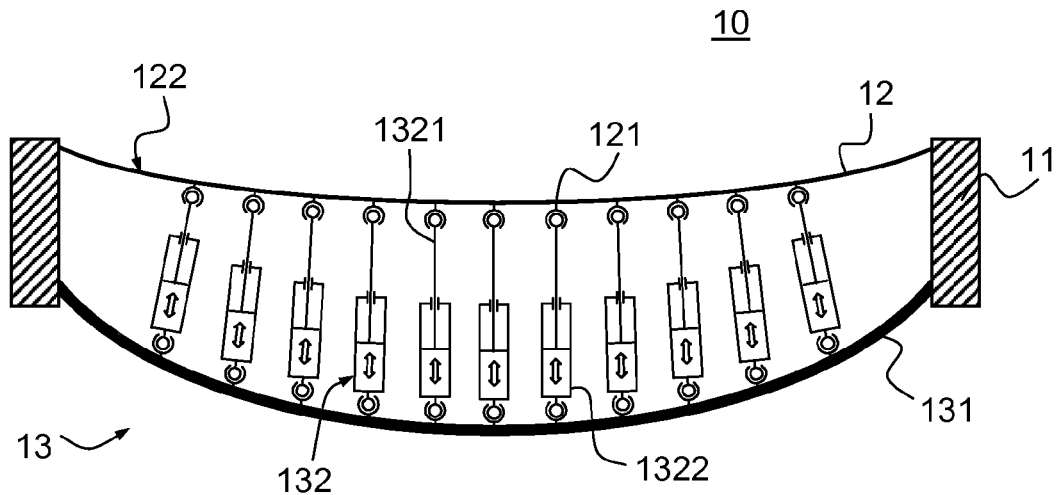
FIG. 1 is a sectional view of one example of a prior art parabolic antenna reflector with a deformable reflecting surface.

FIG. 1 is a sectional view of one example of a prior art parabolic antenna reflector with a deformable reflecting surface. The antenna reflector 10 includes a fixed chassis 11, a flexible membrane 12 and an actuation system 13 enabling deformation of the flexible membrane 12 at different points 121, called deformation points. The flexible membrane 12 is fixed at its periphery to the chassis 11. It includes a reflecting surface 122 of substantially parabolic shape adapted to reflect electromagnetic waves in a predetermined band of frequencies, chosen as a function of the target application. The reflecting surface 122 is formed for example by metallic particles deposited on the surface of the flexible membrane 12. The flexibility of the membrane 12 may be obtained by articulations or by an elastically deformable material. The material of the flexible membrane 12 comprises silicone, for example. The actuation system 13 includes a support 131 fixed to the chassis 11 under the flexible membrane 12, i.e. on the side opposite the reflecting surface 122, and a set of pusher elements 132. The actuation system 13 may include approximately 100 pusher elements 132 distributed under the flexible membrane 12. Each pusher element 132 comprises a rod 1321 and an actuator 1322 for driving the rod 1321 in translation. A free end of each rod 1321 comes into contact with a deformation point 121 of the flexible membrane 12. A ball-joint connection may be provided between the free ends of the rods 1321 and the deformation points 121. The actuators 1322 are fixed to the support 131. They may be fixed to the support 131 by means of ball-joint connections. The pusher elements 132 are shown in FIG. 1 in the form of cylinders, in which case each rod 1321 may correspond to the rod of the associated cylinder. The pusher elements 132 may be electrical cylinders, stepper motors or piezoelectric motors. The actuators 1322 may be controlled in such a manner as to deform the flexible membrane 12 at the level of the deformation points 121.

Figure 2:
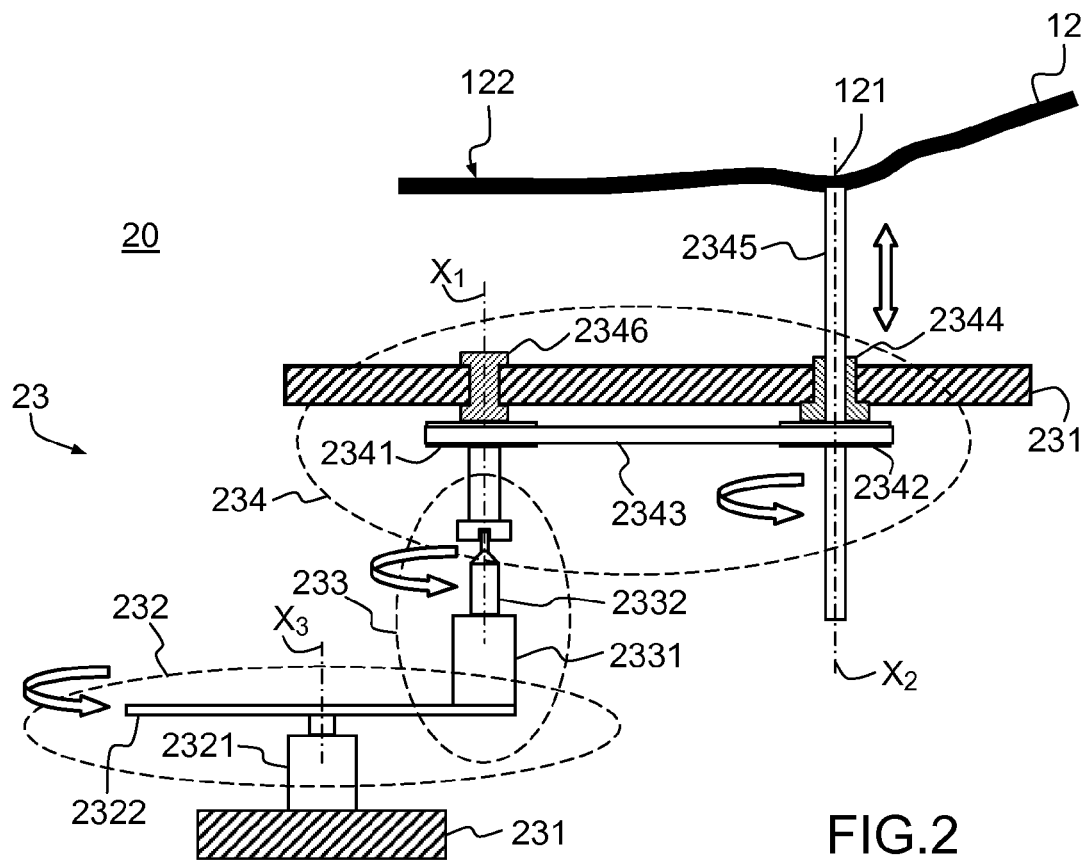
FIG. 2 is a sectional view of one example of a reflector of the invention with a deformable reflecting surface.

FIG. 2 is a sectional view of one example of a reflector with a deformable reflecting surface including an actuation system of the invention. The reflector may have a parabolic shape or any other shape suited to a specific use. The reflector may equip an antenna of a telecommunication satellite. It may equally be used in an optical system as a mirror. The reflector 20 is essentially distinguished from the reflector 10 described with reference to FIG. 1 by its actuation system. The reflector 20 includes a fixed chassis, not shown, a flexible membrane 12 and an actuation system 23 enabling deformation of the flexible membrane 12 at different deformation points 121.

The actuation system 23 includes a fixed structure 231 forming a support, a selector device 232, an actuator device 233 and a set of deformation devices 234. In FIG. 2, only one deformation device 234 is shown for reasons of legibility. The invention nevertheless is of particular benefit when the actuation system comprises a plurality of deformation devices, for example up to several hundred such devices. Each deformation device 234 comprises for example a first pulley 2341, a second pulley 2342, a belt 2343 connecting the pulleys 2341 and 2342, a nut 2344 and a threaded rod 2345 cooperating with the nut 2344. The first pulley 2341 is connected to the fixed structure 231 to pivot about a first axis $X_1$. The pivot connection is produced for example by means of a bearing 2346. The second pulley 2342 is connected to the fixed structure 231 to pivot about a second axis $X_2$ substantially parallel to the first axis $X_1$. In a first embodiment, the second pulley 2342 is connected to the nut 2344 to rotate with it, which is connected to the fixed structure 231 to pivot about the axis $X_2$. The nut 2344 forms a bearing for the second pulley 2342, for example. One end of the threaded rod 2345 is fixed to a deformation point 121 of the flexible membrane 12 in such a manner as to be connected to the flexible membrane 12 to move with it in translation and in rotation about the axis $X_2$. In a second embodiment, the second pulley 2342 is rotationally connected to the threaded rod 2345. The nut 2344 is connected to the fixed structure 231 to rotate with it about the axis $X_2$. The end of the threaded rod 2345 is fixed to the deformation point 121 in such a manner as to be connected to the flexible membrane 12 to move with it in translation and free to rotate about the axis $X_2$. The end of the threaded rod 2345 is for example connected to the deformation point 121 by a pivot connection about the axis $X_2$. In each embodiment, rotation of the second pulley 2342 about the axis $X_2$ drives translation of the threaded rod 2345 along that axis in one direction or the other, according to the rotation direction of the second pulley 2342. Thus the flexible membrane 12 is deformed locally.

The actuation device 233 enables the first pulley 2341 of each deformation device 234 and, via the belts 2343, the second pulleys 2342 to be driven in rotation. It includes an actuator 2331, such as a stepper motor or a piezoelectric motor, and a drive part 2332 that may be driven in rotation by the actuator 2331 about an axis substantially parallel to the axis $X_1$. The drive part 2332 is configured so as to be able to be coupled to each first pulley 2341. For example, the drive part 2332 includes a flat screwdriver type tip and the first pulleys 2341 each include an imprint adapted to receive that tip. This type of tip enables engagement and disengagement of the drive part 2332 and the imprint of the first pulley 2341 on movement in rotation of the actuation device 233 by the selector device 232 without necessitating movement in translation along the axis $X_1$. The drive part 2332 must then effect an integer number of half-turn.

The selector device 232 enables movement of the actuation device 233 toward each of the deformation devices 234 in such a manner that the actuation device 233 may drive the first pulley 2341 of the selected deformation device 234 in rotation. In one particular embodiment, the selector device 232 includes an electric motor 2321 and a support arm 2322. The electric motor 2321 is adapted to drive rotation of the support arm 2322 about a third axis $X_3$ substantially parallel to the axes $X_1$ and $X_2$. The actuation device 233 is fixed to the support arm 2322. In this particular embodiment, the first pulleys 2341 of each deformation device 234 are mounted on the fixed structure 231 in a circular arrangement. The actuation device 233 may thus be brought face to face with each pulley 2341 by rotation of the support arm 2322 about the axis $X_3$ and the deformation devices 234 may be actuated successively. Although the placing of the pulleys 2341 is constrained by the circular movement of the actuation device 233, the second pulleys 2342 may be distributed freely over the fixed structure 231 thanks to the belts 2343.

The actuation system 23 has been described with reference to FIG. 2 considering transmission of rotary movement between the actuation device 233 and the various threaded rods 2345 by a system of belts and pulleys. Transmission may equally be effected by chains or gears, however.

Figure 3:
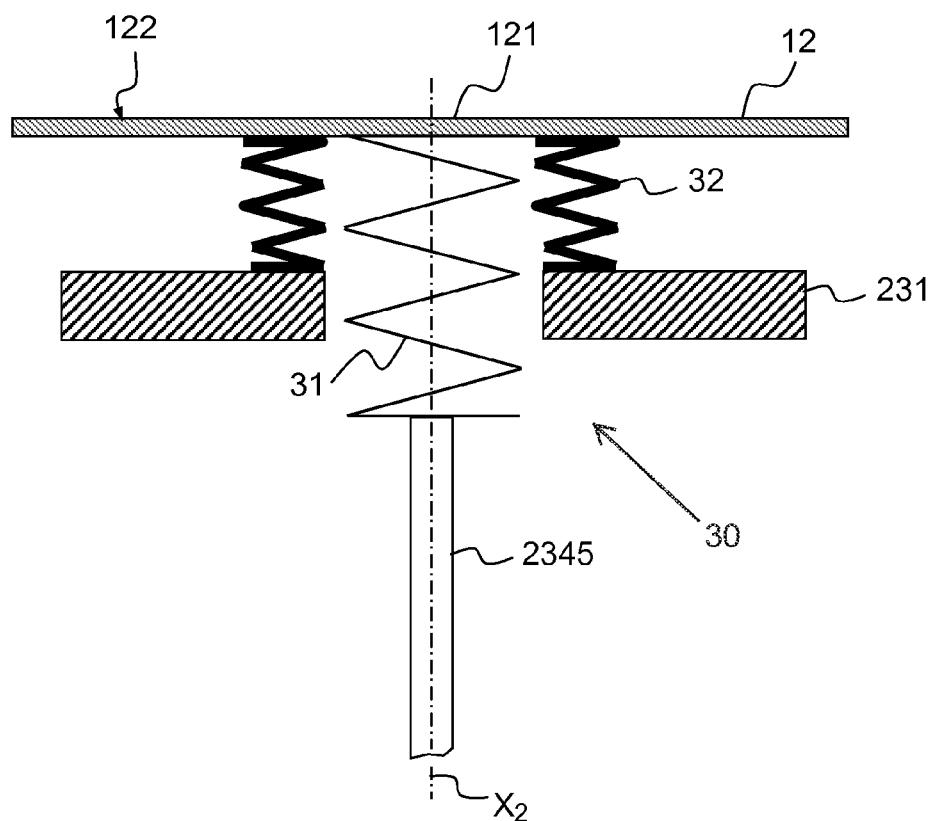
FIG. 3 is a sectional view of one example of a mechanical connection between a deformation device and the reflecting surface.

The mechanical connections between the ends of the threaded rods 2345 and the flexible membrane 12 may, as in the embodiments shown in FIGS. 1 and 2, be connections eliminating the degree of freedom in translation along the axis $X_2$ between the threaded rods 2345 and the membrane 12. They are built-in connections or ball-joint connections, for example. FIG. 3 is a sectional view of one example of a mechanical connection that may be made between the end of a rod 2345 and the flexible membrane 12. The connection 30 includes a first elastic element 31 fixed at one of its ends to the end of the threaded rod 2345 and at its other end to the deformation point 121 of the flexible membrane 12. The connection 30 may equally include a second elastic element 32 fixed at one of its ends to the fixed structure 231 of the actuation system 23 and at its other end to the flexible membrane 12, in the vicinity of the deformation point 121. The elastic elements 31 and 32 may be deformed elastically along the axis $X_2$. In the FIG. 3 embodiment, the elastic elements 31 and 32 are coaxial coil springs. The inside diameter of the second coil spring 32 is greater than the outside diameter of the first coil spring 31 in such a manner as to allow its free passage. Each elastic element may include one or more springs, in series or in parallel. The stiffness $k_1$ of the first elastic element 31 is advantageously substantially less than the stiffness $k_2$ of the second elastic element 32. The connection 30 thus forms a differential stiffness system the effect of which is to limit the deformation of the flexible membrane 12. To be more precise, for a movement of given length of the threaded rod 2345 along the axis $X_2$, the deformation point 121 moves a shorter length along that axis. It is thus possible to deform the flexible membrane 12 with greater precision. Other solutions may be envisaged for reducing the movement of the threaded rods 2345. For example, it is possible to add, between a second pulley 2342 and a deformation point 121, a reducing gear or a micrometer screw, also known as a Prony differential screw.

The invention claimed is:

1. An actuation system configured to actuate a reflector including a chassis and a flexible membrane, the flexible membrane being fixed to the chassis such that the flexible membrane is deformable relative to the chassis, the actuation system comprising:
    a support fixed to the chassis of the reflector;
    a plurality of deformation devices, each deformation device of the plurality of deformation devices including
        a pusher element adapted to be driven in translation relative to the support along a first axis, the pusher element including a part adapted to come into contact with the flexible membrane at a point to deform the flexible membrane;
    an actuation device adapted to individually drive the pusher element of each deformation device along the first axis in translation; and
    a selector device adapted to move the actuation device toward each deformation device individually, in such a manner that the actuation device is configured to individually drive the pusher element of any deformation device selected from the plurality of deformation devices in translation.

2. The actuation system according to claim 1, wherein the actuation device is adapted to generate a movement of rotation relative to the support about the first axis, said movement of rotation transmitting a movement of translation to the pusher element by means of a screw/nut system.

3. The actuation system according to claim 2, wherein each deformation device further includes:
    a first rotary element adapted to be driven in rotation relative to the support about a second axis substantially parallel to the first axis by the actuation device, and
    a second rotary element connected to an element of the nut/screw system to rotate the element of the nut/screw system with the second rotary element about the first axis and adapted to be driven in rotation about the first axis by the first rotary element.

4. The actuation system according to claim 3, wherein each first rotary element includes a first pulley and each second rotary element includes a second pulley, each deformation device further including a belt connecting the first pulley to the second pulley.

5. The actuation system according to claim 3, wherein
    the first rotary elements are distributed over a perimeter of a circle,
    the selector device includes a support arm configured to be driven in rotation about a third axis passing through a center of the circle and orthogonal to a plane of the circle, and
    the actuation device is fixed to the support arm in such a manner as to be able to individually drive any of the first rotary elements of the deformation devices in rotation.

6. The actuation system according to claim 3, wherein the actuation device includes a motor adapted to drive each first rotary element about the second axis in rotation.

7. The actuation system according to claim 1, further comprising, for at least one deformation device, a first elastic member having a first end opposite a second end, the first end of the first elastic member being connected to the part of the pusher element adapted to come into contact with the flexible membrane to move with the pusher element in translation along the first axis, and the second end of the first elastic member being connected to the flexible membrane to move with the flexible membrane in translation along the first axis, the first elastic member being elastically deformable along the first axis.

8. The actuation system according to claim 7, further comprising, for each deformation device including the first elastic member, a second elastic member having a first end opposite a second end, the first end of the second elastic member being connected to the support to move with the support in translation along the first axis, and the second end of the second elastic member being connected to the flexible membrane to move with the flexible membrane in translation along the first axis, the second elastic member being elastically deformable along the first axis, a stiffness of the first elastic member along the first axis being less than a stiffness of the second elastic member along the first axis.

9. A reflector, comprising:
    a chassis;
    a flexible membrane fixed to the chassis such that the flexible membrane is deformable relative to the chassis; and an actuation system configured to actuate the reflector, the actuation system including a support fixed to the chassis, a plurality of deformation devices, each deformation device of the plurality of deformation devices including a pusher element adapted to be driven in translation relative to the support along a first axis, the pusher element including a part adapted to come into contact with the flexible membrane at a point to deform the flexible membrane, an actuation device adapted to individually drive the pusher element of each deformation device along the first axis in translation, and a selector device adapted to move the actuation device toward each deformation device individually, in such a manner that the actuation device is configured to individually drive the pusher element of any deformation device selected from the plurality of deformation devices in translation.

* * * * *